United States Patent [19]
Grant

[11] Patent Number: 5,346,534
[45] Date of Patent: Sep. 13, 1994

[54] PROCESS FOR TREATING AN ARTICLE WITH A VOLATILE FLUID

[75] Inventor: David C. H. Grant, Selbyville, Del.

[73] Assignee: Baxter International Inc., Deerfield, Ill.

[21] Appl. No.: 71,581

[22] Filed: Jun. 2, 1993

Related U.S. Application Data

[63] Continuation of Ser. No. 847,262, Mar. 6, 1992, Pat. No. 5,232,476, which is a continuation-in-part of Ser. No. 581,020, Sep. 12, 1990, Pat. No. 5,106,404.

[51] Int. Cl.⁵ .................................. B01D 19/00
[52] U.S. Cl. ............................... 95/39; 95/250; 95/257; 95/258
[58] Field of Search ................. 95/247–252, 95/257, 258, 266, 39

[56] References Cited

U.S. PATENT DOCUMENTS

| | | | |
|---|---|---|---|
| 2,129,299 | 9/1938 | Bichowsky | 55/50 |
| 3,070,463 | 12/1962 | Barday | 134/11 |
| 3,078,860 | 2/1963 | Rand | 134/69 |
| 4,048,007 | 9/1977 | Valle-Riestra | 162/57 |
| 4,066,423 | 1/1978 | McGill et al. | 55/48 |
| 4,101,340 | 7/1978 | Rand | 134/11 |
| 4,261,707 | 4/1981 | Bradshaw et al. | 55/48 |
| 4,265,642 | 5/1981 | Mir et al. | 55/85 |
| 4,303,454 | 12/1981 | Petterson et al. | 134/11 |
| 4,383,838 | 5/1983 | Barten et al. | 55/48 |
| 4,443,269 | 4/1984 | Capella et al. | 134/12 |
| 4,528,001 | 7/1985 | Yokogawa et al. | 55/37 |
| 4,574,005 | 3/1986 | Cobbs, Jr. et al. | 55/48 |
| 4,620,858 | 11/1986 | Bradshaw et al. | 55/222 |
| 4,708,721 | 11/1987 | Ehrler | 55/40 |
| 4,755,261 | 7/1988 | McCord et al. | 203/4 |
| 4,902,310 | 2/1990 | Vara et al. | 55/46 |
| 4,983,223 | 1/1991 | Gessner | 134/25.4 |
| 5,011,542 | 4/1991 | Weil | 134/38 |
| 5,045,117 | 9/1991 | Witherell | 134/21 |
| 5,051,135 | 9/1991 | Tanaka et al. | 134/10 |
| 5,064,447 | 11/1991 | Lee | 55/16 |
| 5,106,404 | 4/1992 | Grant | 55/195 |
| 5,192,340 | 3/1993 | Grant et al. | 55/23 |
| 5,232,476 | 8/1993 | Grant | 55/42 |

FOREIGN PATENT DOCUMENTS

| | | |
|---|---|---|
| 0130546 | 1/1985 | European Pat. Off. . |
| 0157090 | 10/1985 | European Pat. Off. . |
| 0331611 | 9/1989 | European Pat. Off. . |
| 0371569 | 6/1990 | European Pat. Off. . |
| 0381887 | 8/1990 | European Pat. Off. . |
| 3012759A1 | 10/1981 | Fed. Rep. of Germany . |
| 3124388 | 2/1983 | Fed. Rep. of Germany .......... 55/46 |
| 3907437A1 | 7/1989 | Fed. Rep. of Germany . |
| 2275583 | 1/1976 | France . |
| 2494316 | 5/1982 | France . |
| 2085310 | 4/1982 | United Kingdom . |
| 2085310A | 4/1982 | United Kingdom . |

Primary Examiner—Robert Spitzer
Attorney, Agent, or Firm—Charles R. Mattenson; Thomas S. Borecki; Ronald E. Barry

[57] ABSTRACT

A system for processing a product with a solvent containing volatile constituents, the system including a pressure chamber for receiving the product, a vacuum pump for evacuating the chamber, a solvent recirculating system for admitting the solvent at a predetermined pressure into the chamber, the solvent recirculating system including a heater for maintaining the temperature of the chamber at the saturation temperature of the solvent, gas liquid separator for separating the gas and liquid components of the solvent discharged from the chamber, a first closed loop system connected to the separator to return the gas constituent to the chamber and a second closed loop system connected to the separator to return the liquid component to the chamber.

8 Claims, 6 Drawing Sheets

PROCESS FOR TREATING AN ARTICLE WITH A VOLATILE FLUID

RELATED APPLICATION

This application is a continuation of co-pending application 07/847,262, filed on Mar. 6, 1992, entitled: A SOLVENT RECOVERY AND RECLAMATION SYSTEM, now U.S. Pat. No. 5,232,476, issued on Aug. 3, 1993, which is a continuation-in-part of U.S. application No. 07/581,020, filed on Sep. 12, 1990, entitled: EMISSION CONTROL SYSTEM FOR FLUID COMPOSITIONS HAVING VOLATILE CONSTITUENTS AND METHOD THEREOF, now U.S. Pat. No. 5,106,404, issued on Apr. 21, 1992, both of which are assigned to the same Assignee.

FIELD OF THE INVENTION

The present invention relates to solvent cleaning systems wherein both the gaseous and liquid solvents are separately recycled.

BACKGROUND OF THE INVENTION

In the copending application a solvent vapor emission control system is disclosed in which the solvent vapor is recycled through a closed loop system. This system generally includes a closed chamber in which the processing of items is carried out at atmospheric pressure and thus is capable of use only with cleaning solvents at atmospheric pressure. The balance of the system is dedicated to solvent recovery and reclamation functions.

SUMMARY OF THE PRESENT INVENTION

The present invention relates to a recovery and reclamation system in which a number of related processes are found to be capable of use with minimal modification of a basic vacuum to vacuum, VTV, system. Since the conditions of temperature and pressure within the chamber, once it is isolated from the reclamation and recycling systems, are controllable over wide limits, an entirely new set of operating conditions and, in some cases, new solvents, can be used. The control of the combination of temperature and pressure allows compounds that are gases at room temperature to be liquefied, e.g., HCFC-22 (refrigerant 22) and DME (dimethyl ether), to be used as solvents. Conversely, compounds that are liquids under room conditions can be made to boil at selected temperatures by reducing chamber pressure. Thus, conventional treatment processes, including ultrasonic cleaning (U/S), flushing, low and high pressure sprays and recirculating sprays, immersion; boiling immersion; and spray over immersion; can be used with present solvents as well as compounds not practical in present equipment systems.

One of the primary benefits of the present system includes very low solvent emission generally related to either nonreducible solvent adsorption by the item being cleaned and/or from still bottoms generated in the solvent recycling step. Good maintenance is required to avoid leaks, both of air in and solvent out. High initial and final vacuums are important in reaching the full potential of the VTV solvent emission reduction capability. While there are benefits from using any level of vacuum, the higher the initial and final vacuum, the better. Practical vacuums of 29 inches mercury column or higher are achievable and recommended.

Other principal features and advantages of the invention will become apparent to those skilled in the art upon review of the following drawings, the detailed description and the appended claims.

Figure 1:
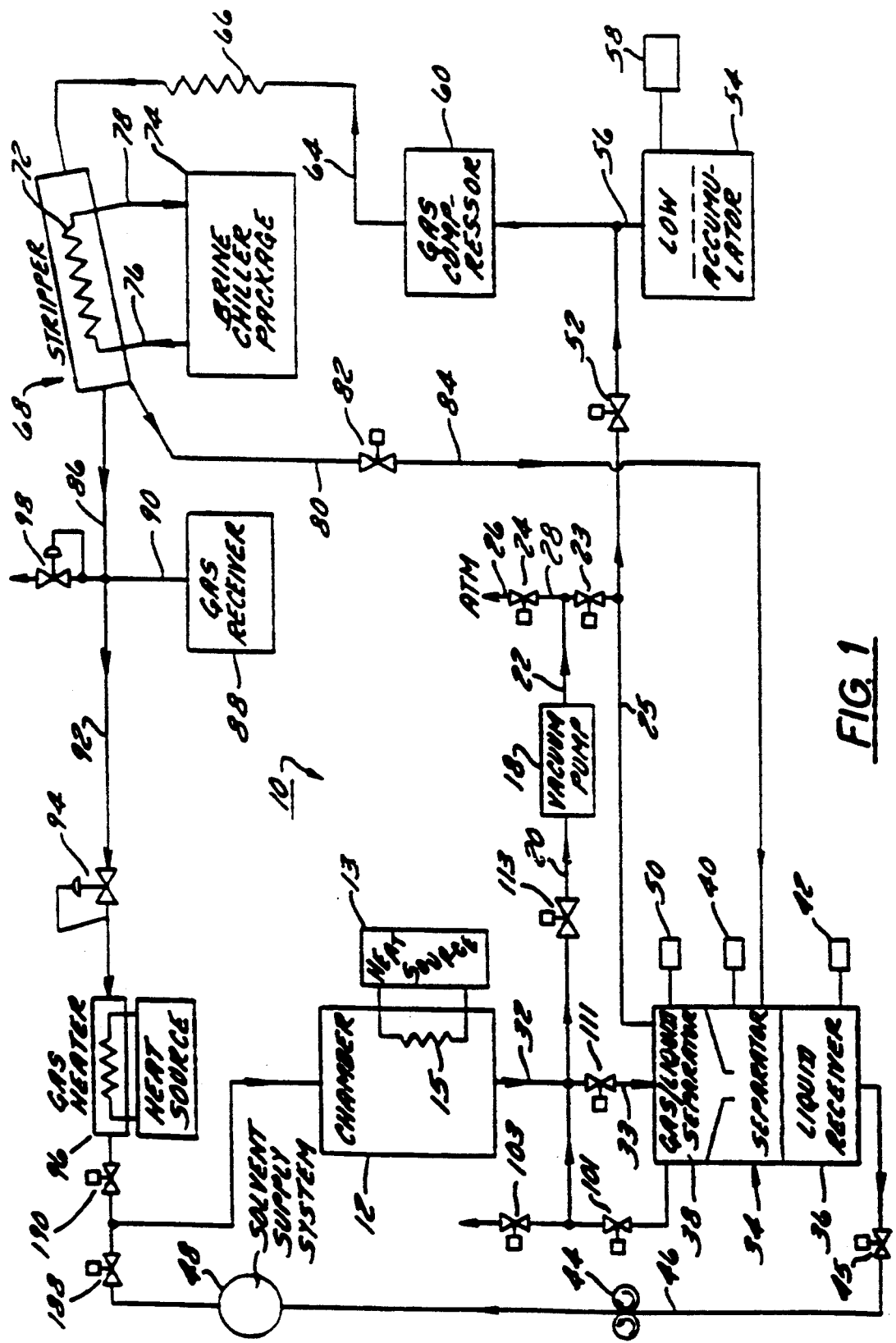
FIG. 1 is a schematic diagram of the basic VTV system.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1, the major components of the recovery and reclamation closed loop system 10 generally include a vacuum chamber 12 which is connected to a vacuum pump 18 through pipe or tube 32, valve 113 and tube 20 to remove the gaseous contents of chamber 12 or directly to gas/liquid separator 34 through valve 111 in tube 33. Valves 23 and 24 are connected to the pump 18 through tube 22 to isolate the chamber 12 and enable the discharge from the vacuum pump 18 to be selectively discharged to atmosphere through valve 24 in tube 26 or to the closed loop system through valve 23 in tube 28 to tube 25. The gas chamber 38 of receiver 34 is connected to a low pressure accumulator 54 through tube 25 and valve 52. The solvent liquid in liquid receiver 36 is discharged to a solvent reclamation reservoir 48 through valve 45 in tube 46. Gas in accumulator 54 is released by instrumentation 58 to a gas compressor 60 through tube 56. Pressurized gas passes through tube 64 to compressor after cooler 66 which is connected to stripper 68 by tube 64. A chiller 74 is connected to heat exchanger 72 by tubes 76 and 78 to maintain a low temperature in heat exchanger 72. Condensed, recovered solvent from stripper 68 is returned to the liquid receiver 36 through tube 80, valve 82 and tube 84. High pressure gas from stripper 68 passes through tube 86 to receiver 88. High pressure gas may be vented through pressure reducing valve 102 to atmosphere or to a carbon adsorber. Gas from receiver 88 passes through tube 92 and pressure reducing valve 94 to a gas heater 96 and control valve 14. The gas is heated in gas heater 96 by a heat exchanger 100 connected to a heat source 98. Solvent from recovery system 48 or solvent gas from heater 96 can be selectively admitted to chamber 12 by means of control valve 14.

The present invention uses the above recovery and reclamation system in a number of related processes as described herein. Only minimal modification is necessary to accommodate the physical characteristics of the various solvents or treatment processes.

The basic VTV (vacuum to vacuum) system as described above operates as follows. An item to be processed is placed in chamber 12. The chamber is sealed. Chamber 12 is isolated from the rest of the system by solenoid valves 188, 190, 101, 103, 111 and 113. Valves 113 and 24 are opened and vacuum pump 18 is activated. The gaseous contents of the chamber are withdrawn and discharged via port 26, either to atmosphere or to a recovery means such as a carbon adsorber or solvent vapor incinerator. Once the air in chamber 12 has been removed, valves 113 and 24 are closed and the vacuum pump 18 is turned off. Valve 101 is opened to gas liquid separator 34 to break the vacuum in the chamber with gas, containing some fraction of solvent vapor, from within the closed loop system 10. An alternative method to break the vacuum is to admit liquid solvent via valve 188 into chamber 12. The admitted liquid will flash to vapor, filling chamber 12 with solvent vapor with only a small fraction of noncondensable gas in it. The benefit of the latter process will be seen below.

Solvent for processing is supplied, under pressure from solvent supply system 48. The solvent supply system can take many forms depending on the solvent used and process requirements. Its function is to receive used solvent and to supply fresh solvent of required purity at the required pressure and volume. It may or may not recycle (purify) the used solvent. Solvent under pressure is admitted to chamber 12 by opening valve 188. The solvent is flushed over the item to be treated in chamber 12 and is drained to the liquid/gas separator 34 through valve 111. Liquid flows by gravity to liquid receiver 36 while solvent vapor or gas rises into gas well 38. When liquid receiver 36 is full, instrumentation 42 opens valve 45. Pump 44 returns liquid solvent to the solvent supply system 48 where it may be processed for reuse.

When instrumentation 50 senses pressure in gas well 38, valve 52 is opened, admitting gas to low pressure gas accumulator 54. Compressor 60 starts. The discharge from compressor 60 is cooled by intercooler 66 before it enters stripper 68. Most of the solvent vapor entering stripper 68 is condensed into liquid form on the cold surface of heat exchanger 72 which, in turn, is kept at low temperature by chiller 74. The stripped, or solvent dehumidified gas leaving stripper 68 accumulates in high pressure gas receiver 88.

At the end of the cycle, most of the gas in the system has been compressed and stored in high pressure accumulator 88. Any excess pressure above set point of pressure relieving valve 102, due to ingested air and the resultant increase effect thereof on maximum system pressure, is vented through valve 102 to atmosphere or through a carbon adsorber or solvent incinerator (not shown).

The process steps are as follows:

1) Gases are evacuated from chamber 12 and discharged to atmosphere.

2) The item to be treated is exposed to solvent through valve 188.

3) Dry air from the closed loop system is blown through valve 190 through chamber 12 to remove as much solvent in liquid form as possible.

4) Heated dry air is circulated through chamber 12 to warm and evaporate the remaining solvent.

5) Chamber 12 is evacuated and its contents discharged within the closed, solvent recovery loop 10. An intermediate vacuum step to improve drying may be bypassed in some processes where a single evacuation will suffice.

6) Chamber 12 is evacuated by vacuum pump 18 and discharged within the closed, solvent recovery loop.

During the purging and drying steps, air from high pressure receiver 88 is conducted through pressure control valve 94 into air heater 96, through valve 190 into chamber 12. The gas circulates sequentially in the closed loop from chamber 12 to gas/liquid separator 34, compressor 60, stripper 68, heater 96 and back to chamber 12 for as long as the process requires.

After the drying step is complete, chamber 12 is isolated once again by closing valves 188, 190, 101, 103, 111 and 113. Valves 113 and 23 are then opened and vacuum pump 18 is started. The contents of chamber 12 are evacuated and, since the gas contains solvent vapor, are discharged within the closed loop system.

The vacuum in chamber 12 is broken with room air by opening valve 103. Chamber 12 may then be opened and the processed item removed. At an appropriate time in the cycle, valve 82 is opened to allow recovered, condensed liquid solvent in stripper 68 to flow through tube 80 to liquid receiver 36.

In the following processes various applications of the closed loop vacuum-to-vacuum process are described wherein the recovery and reclamation closed loop system will remain as described above.

Printed Wiring Assembly Defluxing/Cleaning

Performance and reliability of printed wiring assemblies depends on the level of cleanliness achieved. While no-clean, water and semi-aqueous processes are adequate for many printed wiring assemblies, the more advanced assemblies, with close conductor spacing, require higher cleanliness. Solvents such as CFC-113, methyl chloroform, as well as flammable solvents such as methyl, ethyl or isopropyl alcohol or hydrocarbons, may be used. Chlorodifluoromethane (a/k/a R-22) has been chosen for purposes of exemplifying the capabilities of the system. The term "S-22" is used to indicate the use of chlorodifluoromethane as a solvent.

A defluxing process using the S-22 solvent for cleaning printed wiring assemblies as described herein includes flushing or spraying the assemblies, followed by a recirculation flush or spray if needed and a fresh solvent rinse. Immersion with or without ultrasonic (U/S) agitation followed by flush or spray or other processes can also be used to clean the assemblies.

Figure 2:
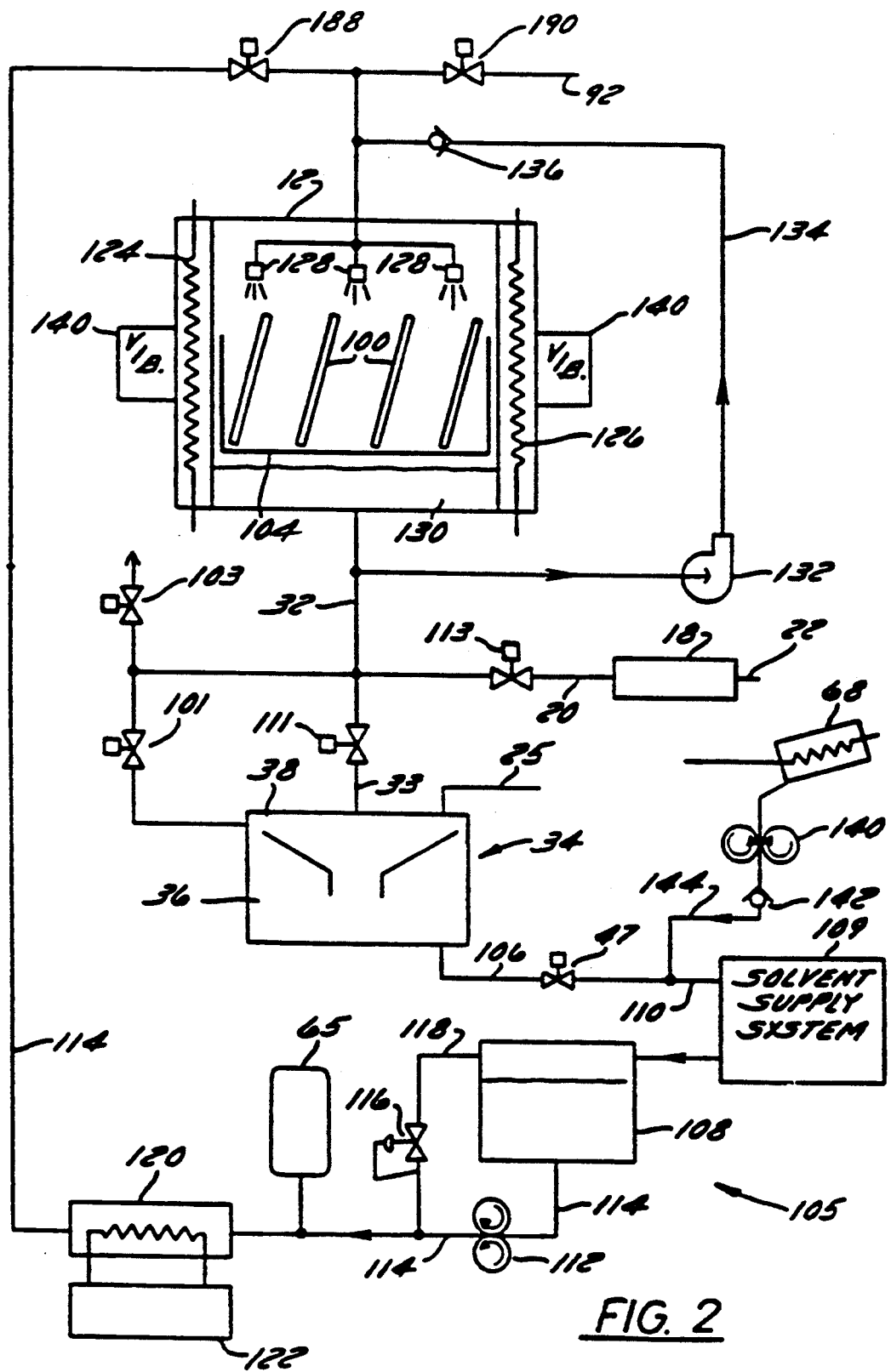
FIG. 2 is a schematic diagram for a defluxing/cleaning system using a solvent recycling system.

Referring to FIG. 2, a system is shown for solvent cleaning of one or more printed wiring assemblies 100 with a solvent that is gaseous at room conditions. The chamber 12 is shown with a number of printed wiring assemblies 100 placed in a spaced relation in basket 104. A solvent supply system 105 is connected to the gas liquid separator 34, through a tube 106 and a valve 47. The liquid flows through tube 106, valve 47 and port 110 into the solvent supply system 109. The purpose of the solvent supply system 109 is to maintain a supply of fresh, liquid solvent to solvent reservoir 108 according to the overall needs of the process. A pump 112 is used to draw liquid from receiver 108 through a tube 114 which is connected to pressure relief valve 116. Pressure in tube 114 in excess of set point of pressure relief valve 116 is vented back to the liquid receiver 108 through line 118. The liquid S-22 is thus maintained at a constant, preset pressure at valve 116.

In order to achieve the proper temperature and pressure for this process, a solvent heat exchanger 120 is provided in tube 114. The heat exchanger 120 is heated from a heat source 122. The wall temperature of chamber 12 is controlled by heaters 124 and 126.

To clean the printed wiring assemblies 100, the chamber 12 is sealed and evacuated by vacuum pump 18 through valve 113 in line 20. Since pressure is required in chamber 12 when using S-22 in liquid form, the vacuum in chamber 12 is broken with liquid solvent by opening valve 188. Liquid S-22, under pressure generated in the solvent supply system 105, is admitted to chamber 12 through valve 188. After the vacuum in chamber 12 is broken, solvent continues to enter the chamber through valve 188, until the pressure reaches the saturation pressure of the S-22 for the temperature in chamber 12. Liquid S-22 entering chamber 12 will not flash to vapor but will remain liquid. In order to achieve the described combination of temperature and pressure for this step in chamber 12, the solvent may be heated in heat exchanger 120. The temperature within the chamber 12 is controlled by heaters 124 and 126. After the treatment process has been completed, valves 111 and 47 are opened to conduct liquid solvent from the chamber to the solvent supply system 109 through tube 32, valve 111, separator 34, tube 106, valve 47 and port 110. When all liquid has been recovered valve 47 is closed. Pressure in the chamber 12 is then reduced to approximately room pressure. Valve 190 is opened and gas in closed loop 10 is circulated, as described in FIG. 1, to dry the parts and recover solvent in the stripper 68. Recovered liquid in stripper 68 is returned to solvent supply system 109 by pump 140 through check valve 142 and tube 144 to port 110. The pressure is relieved by opening valve 111 to gas liquid separator 34. Any solvent gas is reclaimed through the closed loop system 10 as shown in FIG. 1.

The pump 112 draws liquid S-22 from receiver 108 and is supplied to pressure accumulator 65. If the pressure in tube 114 downstream from pump 112 exceeds the set point of pressure relieving valve 116, the liquid is vented back to the receiver 108.

For flushing or spraying processes, solvent S-22 is passed through spray nozzles 128 strategically positioned relative to the printed wiring assemblies 100. When using S-22, the chamber 12, gas liquid separator 34 and solvent reclamation system 105 must be built to contain the pressure of S-22 at process temperatures. That pressure would be 121, 168 or 260 psig at 70°, 90° or 120° F., respectively.

For a recirculating spray followed by fresh rinse, solvent is admitted through valve 188 and the spray heads 128 until a preset volume of liquid S-22 accumulates in the well 130 at the bottom of chamber 12. Valve 188 is closed and pump 132 in line 134 circulates liquid S-22 through one-way valve 136 back to the spray nozzles 128 in chamber 12. Recirculation is continued as long as required.

If an ultrasonic process is used, chamber 12 is provided with ultrasonic vibrators 140 on the walls of chamber 12. The chamber 12 is filled with liquid S-22 to a level above the printed wiring assemblies 100. The control of temperature and pressure for the ultrasonic process is more critical than for other processes. Assuming a given, controlled temperature, pressure may be varied to control the degree of cavitation, thus the severity of the cleaning action of a constant ultrasonic signal. Following the ultrasonic step, chamber 12 is drained through valve 111 to liquid separator 34. It should be noted that the apparatus described will reduce solvent emissions from currently practiced printed wiring assembly cleaning processes. A wider range of solvents may be used since the system is no longer restricted to an atmospheric pressure treatment vessel.

Maintenance Cleaning

Figure 3:
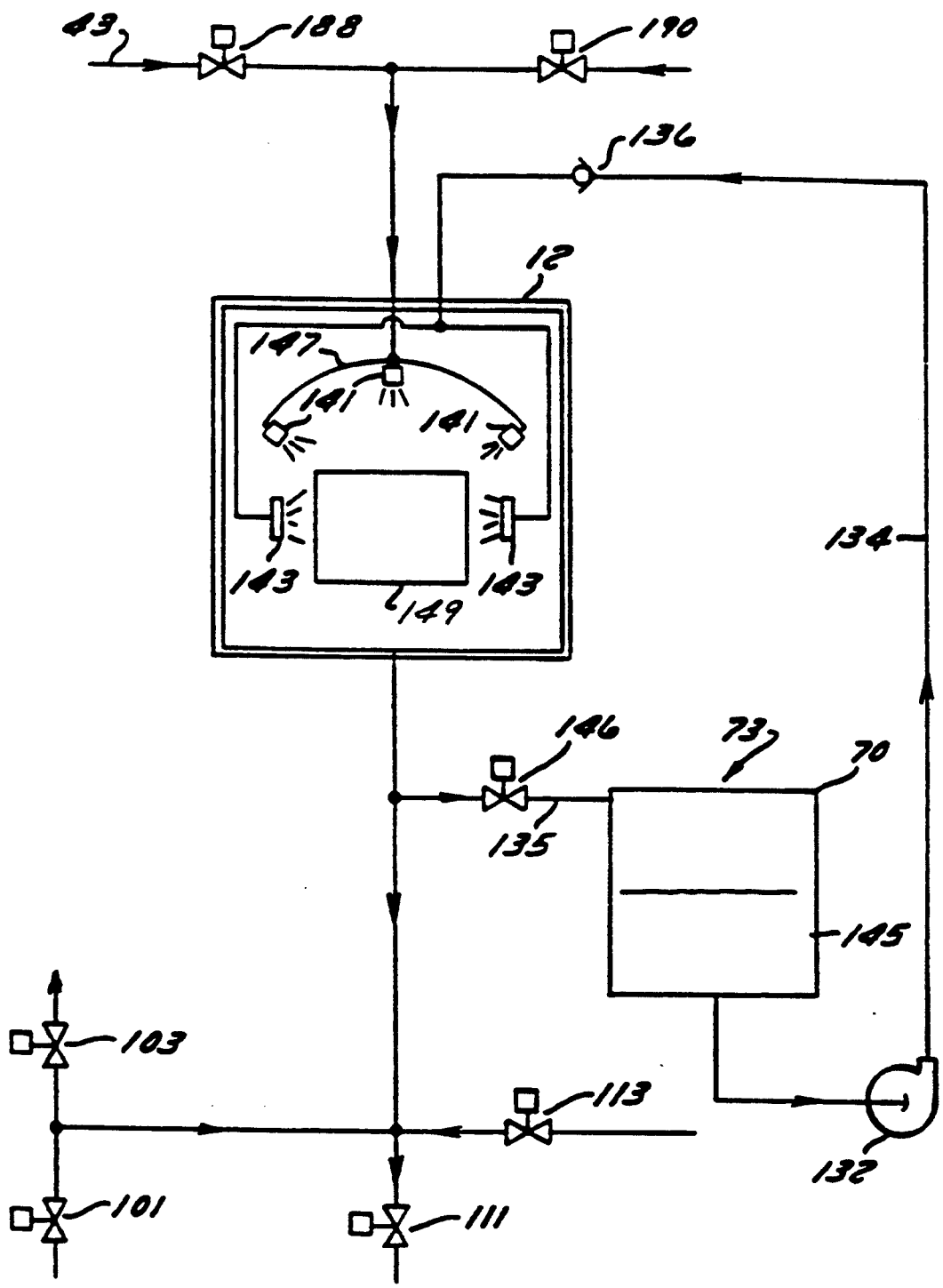
FIG. 3 is a schematic view of a maintenance cleaning system using two solvents.

Referring to FIG. 3, a system is shown for using more than one treatment fluid in the cleaning process. In the case of an electromechanical device such as a typewriter, mechanical clock, or mechanical printer, these devices require periodic cleaning and relubrication to maintain consistent performance. In this type of a cleaning process, chamber 12 is provided with a number of spray nozzles 141 mounted on a manifold 147 at the top of the chamber 12. The mechanical device 149 is placed in the chamber and is initially cleaned with a solvent as described above. After cleaning and drying is complete, a solvent/lubricant solution is pumped from a receiver 145 by a pump 132 through line 134 and check valve 136. A spray manifold 143, separate from the cleaning spray manifold 147, is used to direct the solvent/lubricant solution to the desired locations of the item to be cleaned. In some instances, it may be necessary to fill the chamber 12 to allow the solvent/lubricant to flow into the interstices of mechanical device 149. The solvent/lubricant solution is then drained back to receiver 145 through valve 146 in line 135. A final rinse to cleanse the exterior surface of the lubricant may be used. The nodal drying and final evacuation steps follow. Lubricant is carried into the bearing surfaces and left there as the carrier solvent is evaporated in the drying steps.

Lubricants are available that are insoluble in common solvents. These may be used to prevent removal during the cleaning step.

Clothes Dry Cleaning

Figure 5:
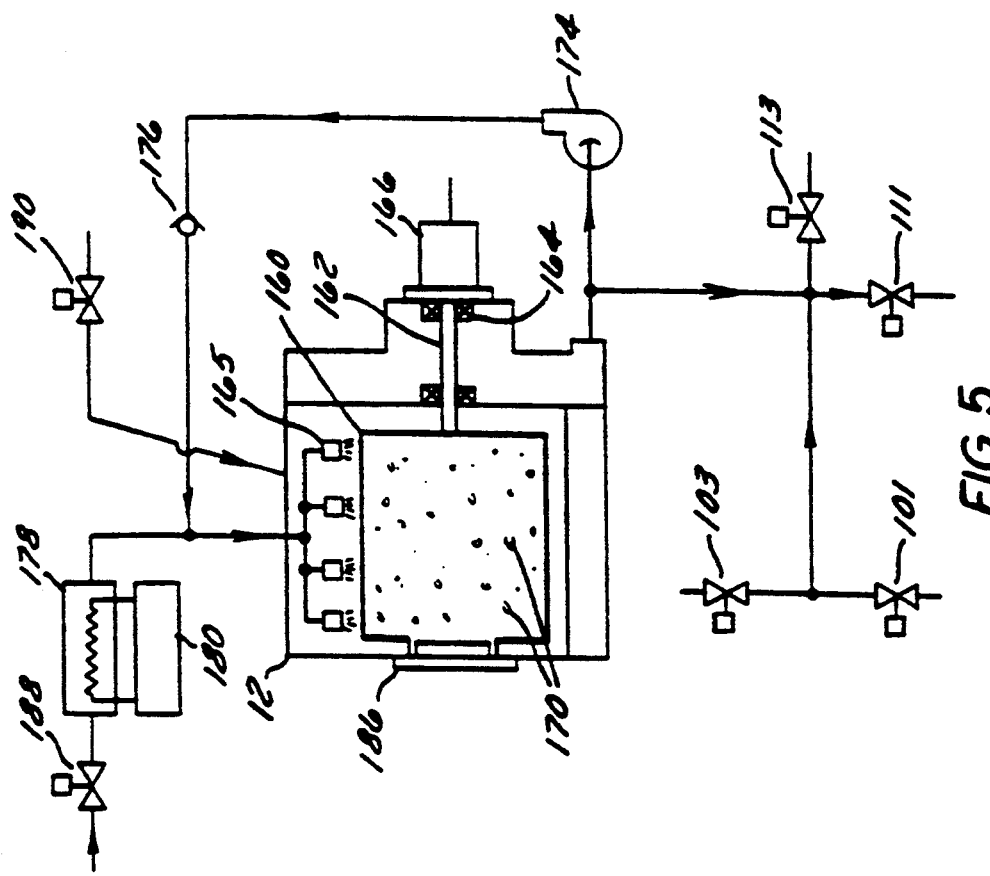
FIG. 5 is a schematic side view of the dry cleaning system of FIG. 4.
Figure 4:
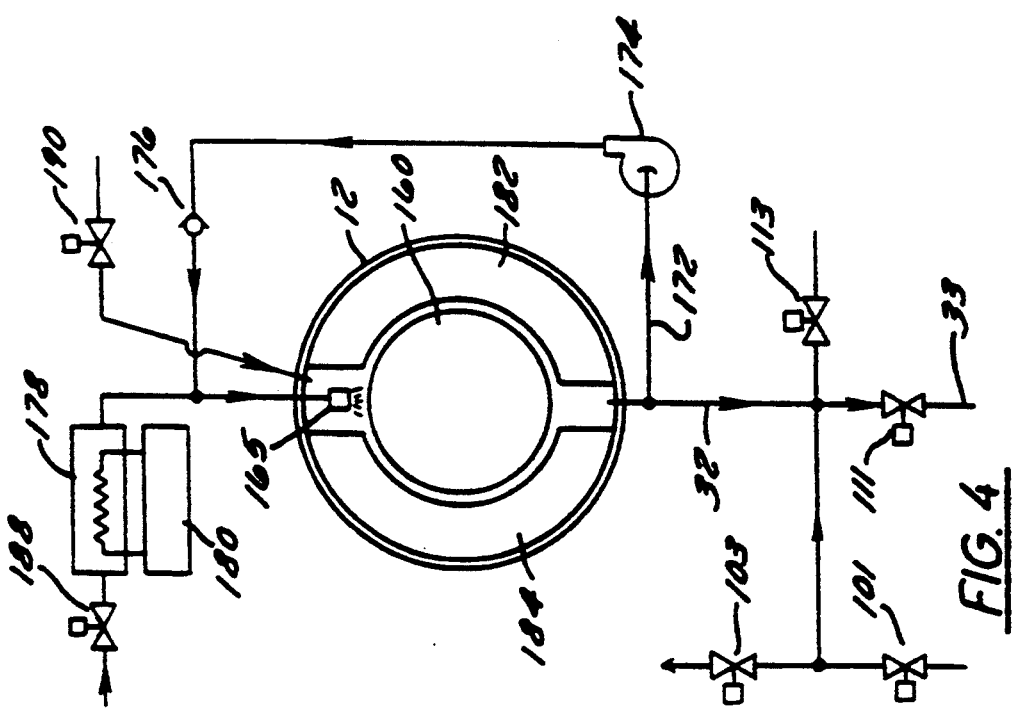
FIG. 4 is a schematic view of a dry cleaning system for laundering clothes.

Referring to FIGS. 4 and 5 a system is shown for laundering or dry cleaning clothes. The chamber 12 as shown includes a rotary tub 160 mounted on shaft 162 in chamber 12. The tube 160 is supported by bearings 164 and rotated by drive mechanism 166. The drive mechanism may be any conventional motor, gear motor, hydraulic motor, etc. for turning the tub 160 at a desired speed for washing and drying and at a higher speed for centrifugal extraction. The top of chamber 12 is provided with a liquid distributor spray system 165 to distribute solvent through the perforations 170 in the outer surface of the tub 160. Chamber 12 includes a drain 172 which is in fluid communication with a circulating pump 174 which draws solvent from the bottom of chamber 12 and recirculates it through check valve 176 to spray system 165. Heat exchangers 178 and heat source 180 control the temperature of the entering solvent and thus control pressure in chamber 12. Spacer blocks 182 and 184 are used to reduce the interior volume of chamber 12, thus controlling the charge of liquid in chamber 12.

In operation the door 186 is opened and the clothes to be treated are placed in tub 160. Door 186 is closed and sealed, as described above. Chamber 12 is evacuated and its contents discharged to atmosphere. Vacuum in tub 160 is broken by opening solenoid valve 188 to allow solvent to enter the chamber. The temperature of incoming solvent is controlled by heat exchanger 178. Maintaining solvent temperature such that the chamber pressure is close to ambient will reduce the effect of any leaks although solvents that are gaseous at room conditions may be used as described in FIG. 2 above. Drive system 166 turns tub 160, tumbling the clothes. Chamber 12 is allowed to fill with liquid to the desired level. Pump 174 recirculates the charge of solvents during the washing step. After washing the solvent charge is drained through valve 111 to the gas liquid separator 34. A clean solvent rinse may be used.

Drive system 166 then turns tub 160 at a higher speed to centrifugally extract as much liquid solvent as possible. Valves 111 and 52 remain open during the drying step.

Valve 190 opens admitting warm dry solvent dehumidified air from the closed loop system 10 to chamber 12. The air passes through tub 160 and the tumbling clothes. The heat provides energy to evaporate the remaining liquid solvent. Solvent vapor is carried by the air in the closed loop 10 to the stripper 68 for condensation and reclamation as described above.

After the liquid solvent has been evaporated and the clothes are dry, chamber 12 is once again isolated from the rest of closed loop 10 by closing valves 188, 190, 111, 103 and 101. Valves 113 and 23 are opened and chamber 12 is evacuated by vacuum pump 18, FIG. 1, discharging through valves 23 into tube 25 in closed loop system 10. Vacuum in the chamber 12 is broken by admitting air through valve 103. The chamber 12 may then be opened to remove the cleaned clothes.

Closed Loop Variation For VTV

Figure 6:
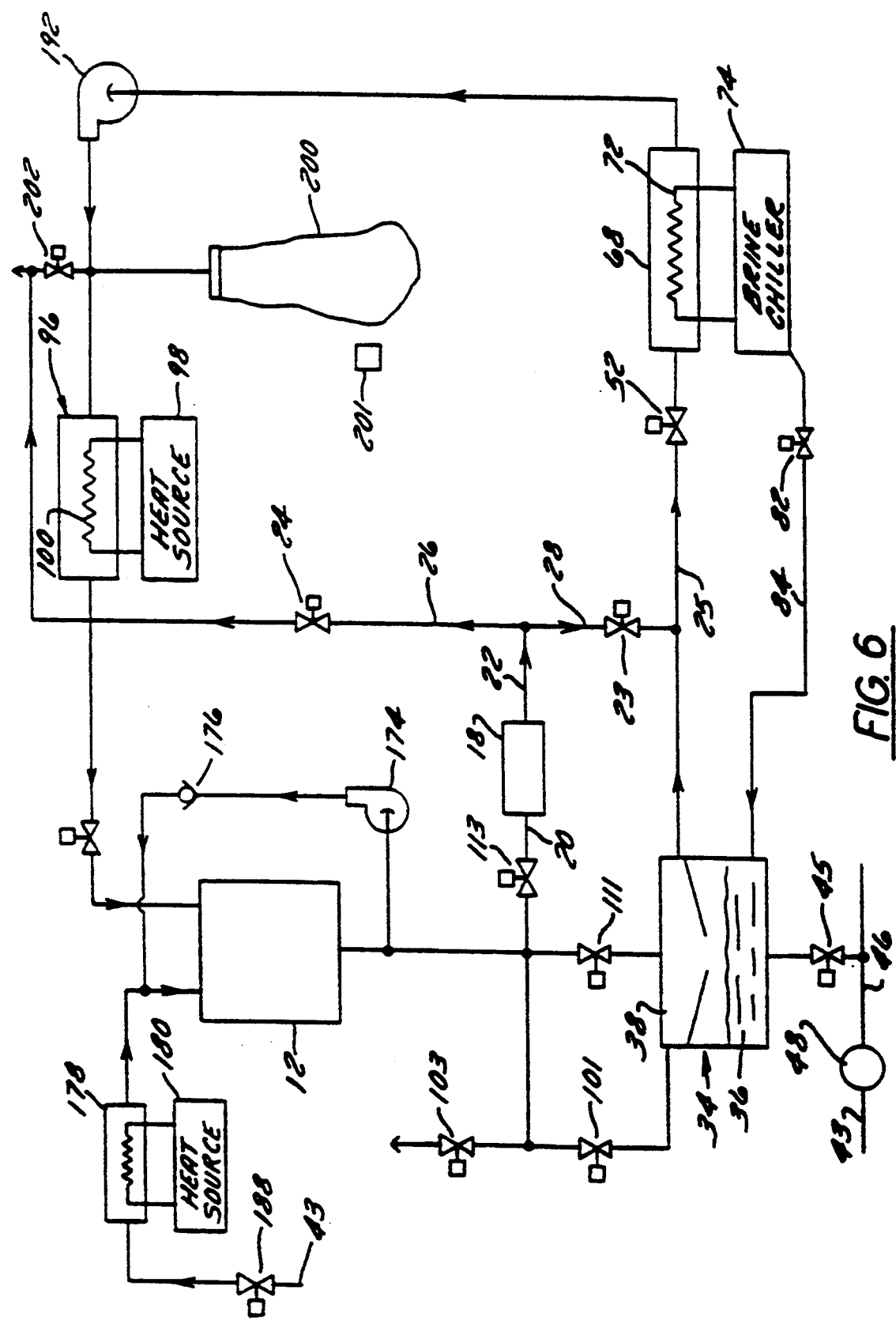
FIG. 6 is a schematic view of an alternate form of dry cleaning system.

The solvent emissions control system as shown in FIG. 6 is a variation of the base system, FIG. 1. Pressure blower 192 replaces compressor 60 and after cooler 66. The blower may be a regenerative blower, with shaft seal, of the EG&G Rotron Degenerative Blower Model DR-404 type. The blower 192 provides the pressure needed to recirculate air through a gas exiting heater 96, chamber 12, gas liquid separator 38 and stripper 68 which is placed downstream of heater 96 to more effectively circulate air in the system. Gas entering stripper 68 is of higher volume than gas exiting heater 96. The amount of air circulating is nearly constant, however the gas volume leaving chamber 12 has been augmented by solvent vapor picked up in the cleaning process within chamber 12. Most of the solvent is condensed in stripper 68, leaving only air with a small fraction of solvent vapor going on to blower 192. The higher gas flow rates speed drying.

The volume of gas within the system will vary depending on the amount of solvent vapor present. An accumulator 200 in the form of a bladder or slack sided accumulator allows containment of the extra volume without increased system pressure. Instrumentation 201 such as a light beam or contact device senses bladder 200 size. When the upper limit of bladder 200 size is reached valve 202 is opened for a predetermined time venting gas from the system. The gas vented through valve 202 contains the lowest concentration of solvent in the system, therefore minimizing solvent loss due to air ingestion and subsequent venting of that air.

As before, after drying is complete chamber 12 is sealed by closing valves 101, 103, 111, 113, 188 and 190. Valve 113 is opened and vacuum pump 18 evacuates chamber 12 discharging air/solvent vapor mixture through valve 23 to tube 25 in the closed loop system 10. It is mentioned above that several intermediate vacuums followed by heated air circulation enhances the speed and completeness of the solvent removal.

A variety of solvent handling strategies to enhance cleaning on one hand and reduce solvent reclamation volume on the other hand may be used. One may treat the solvent with a filter adsorber or distiller for each batch of clothes to get the ultimate in cleanliness. The basic charge for the washing step may be retained so that it can be used over until its soil content reaches some limit. The washing charge may be diluted in each cycle with a rinse charge to maintain soil level in the washing charge at some more or less constant.

Displacement Drying

Water removal from a metal, plastic or glass component following a water process poses several problems. Evaporative drying both uses significant amounts of energy and leaves a residue from water droplets deposited on the surface of the item. Water displacement, i.e. the floating of water droplets from the surface and water adsorption processes have been commercialized by others.

Displacement processes use alcohol adsorption or FREON TM T-DFC solvent, a CFC-113 base solvent/detergent mixture, to displace water and remove it from the surface of the item being dried. The detergent then is removed by a solvent cleaning step. The cleaning solvent evaporates spot-free. In the adsorption process an alcohol such as methyl, ethyl or isopropyl alcohol which has the capacity to adsorb water, up to the saturation limit of the alcohol, is flushed over the part to be dried. Most often a nonflammable solvent such as CFC-113 is used in combination with the alcohol to keep the resultant mixture nonflammable.

Figure 7:
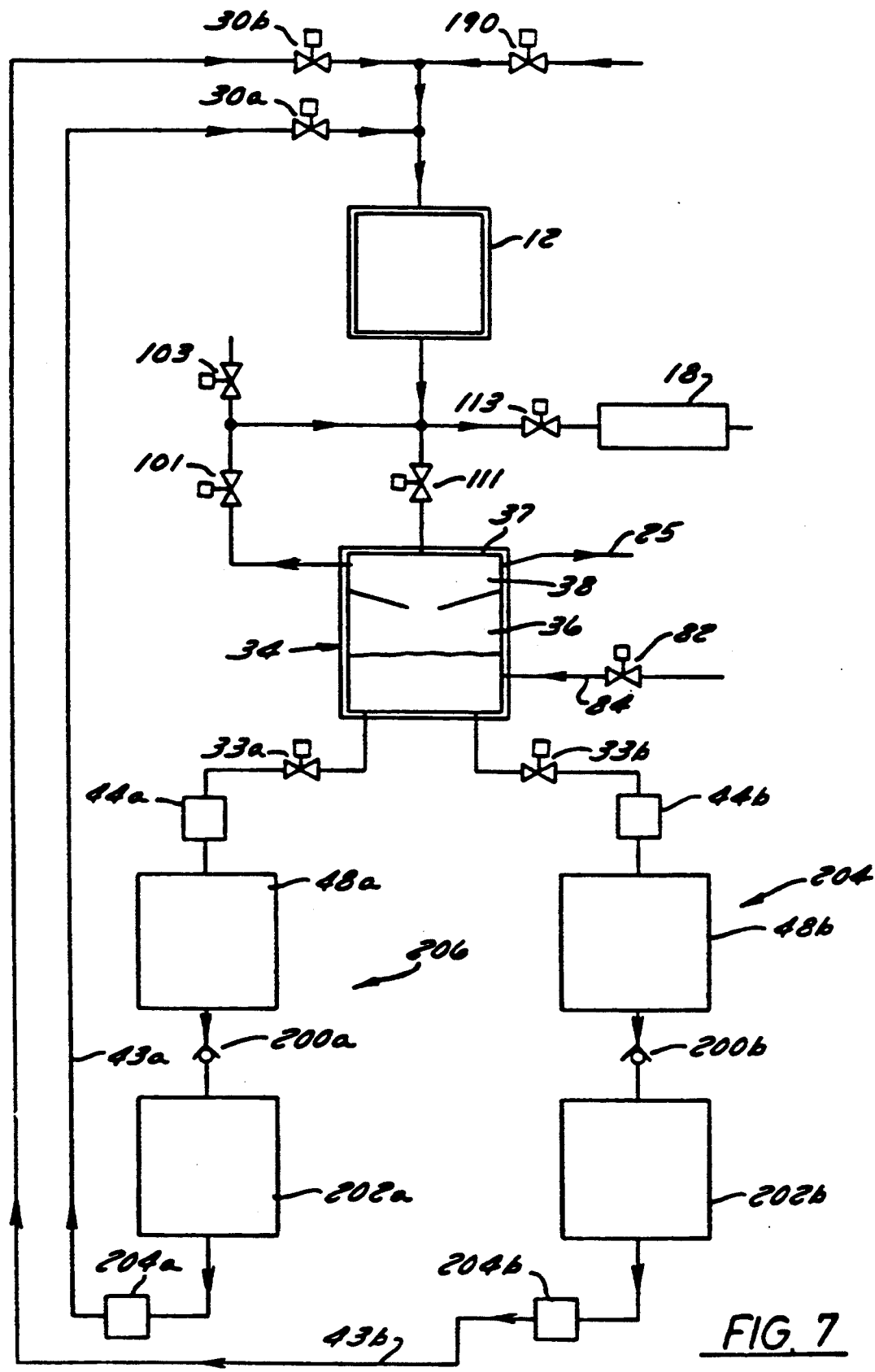
FIG. 7 is a schematic view of displacement and drying system for water removal from metal, plastic or glass.

Referring to FIG. 7 a displacement drying system using two solvent solutions is shown. In this system gas/liquid separator 34 is connected to two liquid supply systems, one for the solvent/detergent solution 204 and the other for the clean solvent 206.

Product is introduced into chamber 12 using the vacuum steps described above. During the dewatering step solvent-detergent solution is drawn from reservoir 202b by pump 204b and enters chamber 12 through tube 43b and valve 30b. Water is displaced and is carried from chamber 12 with the solution. Liquid solution is returned to solvent supply system 48b through valve 33b and pump 44b. Solvent supply system 48b provides solution of proper composition to reservoir 202b through check valve 200b. Vaporized solvent is recovered in closed loop 10 as described above. That solvent is distilled solvent free of detergent and may be returned to the solvent reservoir 202a through valve 33a, pump 44a, supply system 48a and check valve 200b.

After all liquid solution has been drained from gas-liquid separator 34 the part is flushed by admitting fresh solvent from reservoir 202a via pump 204a, tube 43a and valve 30a into chamber 12. Solvent liquid is returned to the solvent supply system where the detergent is removed and the solvent is purified to the extent required.

After the dewatering and detergent removal steps the item being processed is dried and removed by the evacuation process described above.

Cross contamination of detergent into cleaning solvent may be reduced by providing a short rinse of clean solvent from tank 202b through valve 30b and diverting the rinse effluent into the drying agent tank 202a. The option of directing recovered solvent from stripper 68 through valve 82 to either the drying agent tank 202a or the solvent tank 202b is based on the contamination level of detergent in the return solvent.

Thus, it should be apparent that there has been provided in accordance with the present invention a solvent recovery and reclamation system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A process for treating an article with a volatile fluid, which comprises:
   (a) disposing the article in a chamber in a manner that admits air to the chamber;
   (b) sealing the chamber;
   (c) evacuating the chamber to remove substantially all of the air therefrom;
   (d) introducing the fluid into the chamber so that the fluid contacts the article and fills the chamber with fluid vapors;
   (e) evacuating the chamber to remove fluid vapors therefrom;
   (f) drying the article by circulating a gas through the chamber;
   (g) then evacuating the chamber to remove residual fluid vapors therefrom; and
   (h) then opening the chamber and removing the treated article from the chamber.

2. The process of claim 1, further comprising repeating (e) and (f) one or more times prior to final evacuation (g).

3. The process of claim 1, wherein the gas circulated in (f) is resident in a closed loop including the chamber, further comprising condensing fluid vapor from the gas in a stripper, the gas containing fluid vapor being circulated from the chamber to the stripper and back to the chamber again.

4. The process of claim 3, wherein the gas consists essentially of air retained within the closed loop, further comprising a step of relieving pressure within the closed loop due to air build-up caused by residual air present in the chamber after (c).

5. The process of claim 3, further comprising heating the gas prior to circulating it through the chamber by passing the gas through a heater provided in the closed loop disposed downstream from the stripper.

6. The process of claim 5, further comprising compressing the gas, prior to condensing fluid vapor therefrom in the stripper, in a compressor provided in the closed loop upstream from the stripper between the chamber and the stripper.

7. The process of claim 1, further comprising heating the gas prior to circulating it through the chamber.

8. The process of claim 1, further comprising a step of filling the evacuated chamber with air prior to opening the chamber and removing the article therefrom in (h).

* * * * *